(12) United States Patent
Jones

(10) Patent No.: US 6,455,633 B1
(45) Date of Patent: Sep. 24, 2002

(54) POLYMERS MADE FROM THE REACTION OF ROSIN AMIDOAMINE/ POLYETHYLENEAMINE MIXTURES WITH A MULTIFUNCTIONAL ACRYLATE ESTER

(75) Inventor: Raymond H. Jones, Lynn Haven, FL (US)

(73) Assignee: International Paper Company, Stamford, CT (US)

( * ) Notice: Subject to any disclaimer, the term of this patent is extended or adjusted under 35 U.S.C. 154(b) by 0 days.

(21) Appl. No.: 09/483,872

(22) Filed: Jan. 18, 2000

(51) Int. Cl.⁷ .......................... C08G 63/48; C08G 63/91

(52) U.S. Cl. ....................................... 525/54.4

(58) Field of Search ........................ 525/54, 4

(56) References Cited

U.S. PATENT DOCUMENTS

| | | |
|---|---|---|
| 3,127,365 A | 3/1964 | Floyd |
| 3,445,441 A | 5/1969 | Rushton |
| 4,198,331 A | 4/1980 | Buchwalter et al. |
| 4,675,374 A | 6/1987 | Nichols |
| 4,776,985 A | 10/1988 | Keyser et al. |
| 4,975,498 A | 12/1990 | Frihart |
| 4,987,160 A | 1/1991 | Frihart et al. |
| 5,155,177 A | 10/1992 | Frihart |
| 5,208,319 A | 5/1993 | Schilling |

*Primary Examiner*—Nathan M. Nutter
(74) *Attorney, Agent, or Firm*—Onofrio Law; Dara L. Onofrio, Esq.

(57) ABSTRACT

A polymer having the following structural formula:

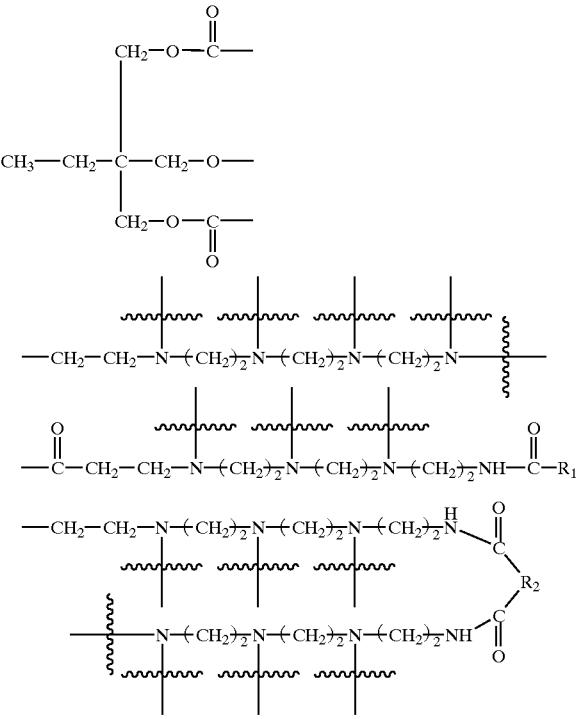

where $R_1$=rosin;
$R_2$=dimer rosin or fatty acid dimer or $R_1$.

The polymer is derived from the reaction of a rosin amidoamine/polyethyleneamine mixture and a multifunctional acrylate ester under controlled conditions.

10 Claims, No Drawings

POLYMERS MADE FROM THE REACTION OF ROSIN AMIDOAMINE/ POLYETHYLENEAMINE MIXTURES WITH A MULTIFUNCTIONAL ACRYLATE ESTER

FIELD OF INVENTION

This invention generally relates to polymers produced from the reaction of a rosin amidoamine and polyethyleneamine mixture with a multifunctional acrylate ester. More particularly, it concerns a solventless process for producing such polymers.

BACKGROUND ART

Tall Oil rosin is a natural product which is isolated from pine trees during the paper making process. It is mainly a mixture of cyclic, monofunctional organic acids (having 20 carbon atoms) which is a solid at room temperature (softening point of approximately 75° C.).

It is widely used in resins for adhesives due to the adhesion it imparts. It is widely used in resins for lithographic and publication gravure inks due to the high softening point it imparts. Rosin is a minor component of alkyd resins for oil based paints when increased hardness is desirable. Rosin is a major component in low viscosity resins for thermoplastic roadmarking stripes which are applied at elevated temperatures without the use of solvent.

Monomeric rosin has not previously been used in two component systems for protective coatings, such as: (1) epoxy coatings derived from epoxy resins and amine curing agents, and (2) polyurethane coatings derived from diisocyantes and diol ether oligomers. The present invention utilizes the desirable properties imparted by rosin in other resins to form a useful polymer derived from the reaction of a rosin amidoamine/polyethylene-amine mixture with a multifunctional acrylate ester.

Polyethyleneamines such as triethylenetetramine (TETA) react very rapidly with multifunctional acrylate esters, such as trimethylolpropane triacrylate (TMPTA) via the Michael addition. However, the resulting polymers are brittle and generally lacking in strength. This reaction is highly exothermic. The exotherm can be modified by first reacting a portion of the TETA with rosin to form a rosin/TETA amidoamine. In the present invention, enough rosin is reacted with a given amount of TETA in order to achieve a product which is about 67% amidoamine and about 33% free TETA. One part of such mixture is then reacted stoichiometrically with two parts of TMPTA in a controlled-manner to form a useful polymeric protective coating.

In general aminoamide acrylate polymers and modified compositions are known in the art. The following patents are representative of such polymers and compositions.

U.S. Pat. Nos. 4,975,498, 4,987,160 and 5,155,177 to Frihart et al. disclose acrylate-modified aminoamide resins that are either thermally curable or radiation-curable.

U.S. Pat. No. 3,445,441 to Rushton discloses aminoamido polymers modified by reaction with a monoacrylate ester.

U.S. Pat. No. 4,198,331 to Buchwalter et al. discloses a curable resinous composition comprising a polyamine resin.

U.S. Pat. No. 4,675,374 to Nichols discloses certain solventless polymer compositions which are reaction products of acrylate/amine adducts and polyacrylates.

From the prior art described, there is no aminoamide acrylate polymer having the structural formula:

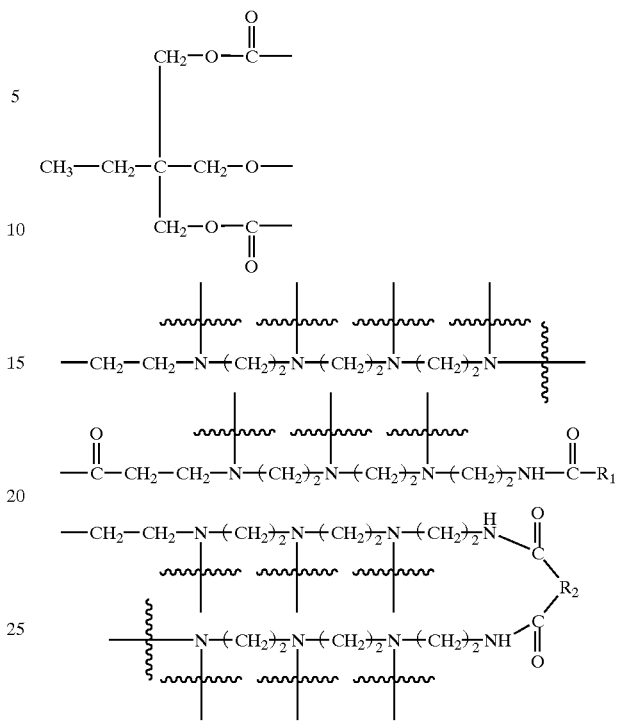

where $R_1$=rosin;

$R_2$=dimer rosin or fatty acid dimer or $R_1$.

There is a need in the industrial coatings area for a polymer produced by a solventless process which imparts the desirable properties of rosin.

Accordingly, it is a broad object of the invention to provide a polymer produced from the reaction of a rosin amidoamine/polyethyleneamine mixture and a multifunctional acrylate ester under controlled conditions.

Another object of the invention is to provide an amidoamine/polyethyleneamine mixture derived from the reaction of rosin with excess polyethyleneamine.

A specific object of the invention is to provide a polymer that has water and UV resistance and has good adhesion to metal surfaces.

DISCLOSURE OF THE INVENTION

In the present invention, these purposes, as well as others which will be apparent, are achieved generally by providing a polymer produced from the reaction of a rosin amidoamine/polyethyleneamine mixture and a multifunctional acrylate ester. The mixture can further be comprised of a dimer fatty acid and/or a rosin dimer.

Preferably the multifunctional acrylate ester is trimethylolpropane triacrylate (TMPTA).

In general, the amidoamine/polyethyleneamine mixture is derived from the reaction of rosin with excess polyethyleneamine. Preferably, the mixture contains free polyethyleneamine in an amount of approximately 33% by weight.

The invention also provides a solventless process for producing the polymer by reacting one part of the mixture with two parts of the multifunctional acrylate ester. The resulting polymer has water and UV resistance and has good adhesion to metal surfaces.

Other objects, features and advantages of the present invention will be apparent when the detailed description of the preferred embodiments of the invention are considered.

DETAILED DESCRIPTION OF THE PREFERRED EMBODIMENTS

In accordance with the present invention a polymer having the following structural formula is provided:

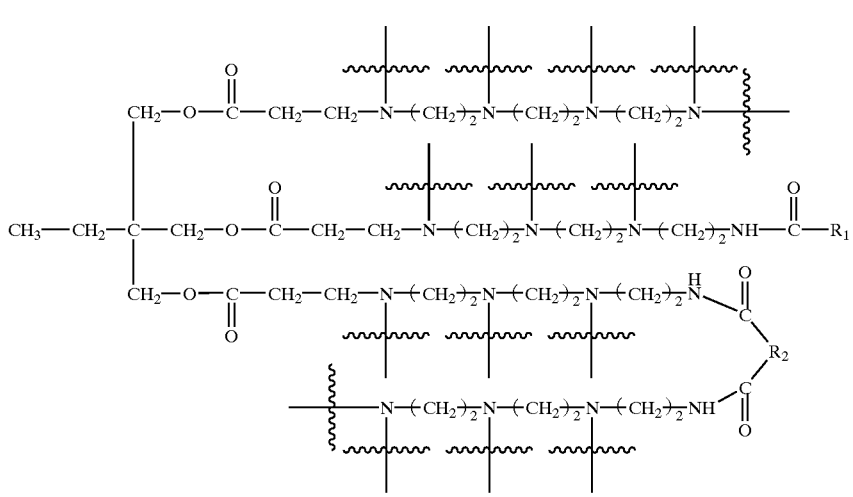

where $R_1$=rosin;
$R_2$=dimer rosin or fatty acid dimer or $R_1$.

The polymer is produced from the reaction of component A and component B under controlled conditions. In general, component A is a rosin amidoamine/polyethyleneamine mixture and component B is a multifunctional acrylate ester. Preferably one part said component A is reacted with two parts of said component B.

In other embodiments of the invention, component A mixture is further comprised of a dimer fatty acid and/or a rosin dimer. In preferred embodiments component B is trimethylolpropane triacrylate (TMPTA), and the polyethyleneamine is triethylenetetramine (TETA).

In another alternate embodiment, component A is further comprised of a dimer fatty acid and component B is trimethylolpropane triacrylate (TMPTA).

In yet another alternate embodiment, component A is further comprised of a dimer rosin and component B is trimethylolpropane triacrylate.

In still another alternate embodiment component A is further comprised of dimer rosin and a dimer fatty acid and component B is trimethylolpropane triacrylate (TMPTA).

In all embodiments of the invention, the polymers produced have water and UV resistance and exhibit good adhesion to metal surfaces.

Both monomeric and dimeric rosins are used in the invention. Rosin is derived from pine trees (chiefly *Pinus valustris* and *Pinus elliottii*). Gum rosin is the residue obtained after the distillation of turpentine oil from the oleoresin tapped from living trees. Wood rosin is obtained by extracting pine stumps with naphtha and distilling off the volatile fraction. Tall oil rosin is a co-product of the fractionation of crude tall oil from the conventional paper making process when the wood is pulped to make paper. The principle constituents of rosin are rosin acids of the abietic and pimaric types. These acids usually have the general formula $C_{19}H_{29}COOH$ with a phenanthrene nucleus.

The addition of dimer acids to the rosin/polyethyleneamine formulation has beneficial effects. Two types of dimer acids are used in the invention: (1) rosin dimers, such as Sylvatac 295 commercially available from Arizona Chemical, Panama City, Fla., and (2) fatty acid dimers, such as Sylvadym T-18, also commercially available from Arizona Chemical, Panama City, Fla. Sylvatac 295 is a mixture of monomeric and dimeric rosin acids derived from the dimerization of tall oil rosin (TOR). The dimer content of Sylvatac 295 is 35–40%. Sylvadym T-18 is a mixture of dimeric and trimeric fatty acids derived from the dimerization of tall oil fatty acids (TOFA). The dimer content of Sylvadym T-18-is 80–85%.

The invention also provides a solventless process for producing the polymer having structural formula I described above. In general, as the components are described above, component A is reacted with component B under controlled conditions to form the polymer. In the process one part component A is reacted with two parts component B under controlled temperatures.

The invention also provides an amidoamine/polyethyleneamine mixture derived from the reaction of rosin with an excess of polyethyleneamine. The excess, or free unreacted, polyethyleneamine in the mixture is approximately 33%. by weight.

In one embodiment of the invention the mixture is derived from the reaction of rosin, dimer fatty acid and polyethyleneamine.

In another embodiment of the invention the mixture is produced from the reaction of rosin, dimer rosin and polyethyleneamine.

In yet another embodiment of the invention the mixture is produced from the reaction of rosin, dimer rosin, dimer fatty acid and polyethyleneamine.

A preferred polyethyleneamine used in the invention is triethylenetetramine. In a specific process embodiment, triethylenetetramine is charged in the mixture in an amount of approximately 55%. by weight and said rosin is charged in the mixture in an amount of approximately 45% by weight.

In another embodiment triethylenetetramine is charged in the mixture in an amount of approximately 55% by weight; said rosin is charged in the mixture in an amount of approximately 40% by weight and said dimer fatty acid is charged in the mixture in an amount of approximately 5% by weight.

In another alternate embodiment triethylenetetramine is charged in the mixture in an amount of approximately 55% by weight; said rosin is charged in the mixture in an amount of approximately 29% by weight and said dimer rosin is charged in the mixture in an amount of approximately 160% by weight.

In yet another alternate embodiment triethylenetetramine is charged in the mixture in an amount of approximately 55% by weight; said rosin is charged in the mixture in an amount of approximately 26% by weight; said dimer rosin is present in the mixture in an amount of approximately 14% by weight and said dimer fatty acid is charged in the mixture in an amount of approximately 5% by weight.

The variations of the invention amidoamine/polyethyleneamine reaction mixtures are summarized in Table I below.

TABLE I

AMIDOAMINE/POLYETHYLENE AMINE REACTION MIXTURES

| COMPONENT | REACTION MIXTURE 1 | REACTION MIXTURE 2 | REACTION MIXTURE 3 | REACTION MIXTURE 4 |
|---|---|---|---|---|
| TALL OIL ROSIN | 40% | | 45% | |
| ROSIN DIMER* | | 40% | | 45% |
| FATTY ACID DIMER** | 5% | 5% | | |
| TETA | 55% | 55% | 55% | 55% |

*Sylvatac 295 available from Arizona Chemical, Panama City, Florida;
**Sylvadym T-18 available from Arizona Chemical, Panama City, Florida As illustrated further in the Examples, the polymer from the reaction of one part of REACTION MIXTURE 2 with two parts of TMPTA had the best adhesion, hardness, water resistance, UV resistance and chemical resistance as illustrated by the results in the Coatings Evaluation TABLE VII as compared to the polymers made from REACTION MIXTURES 1, 3 and 4. However, the reaction mixture of one part REACTION MIXTURE 1 and two parts TMPTA had about half the viscosity at 25° C. versus the other reaction mixtures. See TABLE III.

REACTION MIXTURE 1 is preferred in intended applications involving extruding or spraying the reaction mixtures at elevated temperatures in a solventless form because of its lower viscosity. In spraying applications, REACTION MIXTURE 1 would be placed in one chamber and TMPTA in another. The contents of both chambers are mixed and reacted in a 1:2 ratio in the nozzle of the spray gun applicator.

The invention provides an advantage over polyurethane, epoxy, and polyester (alkyd) coatings which are all solvent based. A comparison of these protective coatings with the present invention is in TABLE II below.

TABLE II

COMPARISON COATINGS

| COMPARISON | POLY-URETHANE | EPOXY | ALKYD | INVENTION |
|---|---|---|---|---|
| NUMBER OF COMPONENTS | TWO | TWO | ONE | TWO |
| CURE TYPE | CHEMICAL ADDITION | CHEMICAL ADDITION | AUTO-OXIDATION | CHEMICAL ADDITION |
| AMBIENT CURE | YES | YES | YES | YES |
| SOLVENT BASED | YES | YES | YES | NO |

TMPTA used in the invention was obtained from CPS Chemical Company and has a viscosity of 45 cps at 25° C. This is a much lower viscosity than that of the resins used in the comparison. For example, liquid epoxy resins (EEW 190—epoxide equivalent weight of 190—such as DER®331 available from Dow Chemical or EPON®828 available from Shell) may have a viscosity of around 10,000 cps at 25° C. The reaction mixture of one part MIXTURE 1 and two parts TMPTA has a viscosity at 50° C. of 1,250 cps two minutes after it is mixed. Lower viscosities are obtained at higher temperatures, but such mixtures must be extruded or sprayed soon after mixing due to the rapid reactions which take place at those temperatures—see Coating Evaluation TABLE IX for cure rates of MIXTURE 1/TMPTA at different temperatures.

The following examples illustrate various aspects of the invention but are not to be interpreted as limiting it.

EXAMPLE I

Preparation of Amidoamine/polyethyleneamine MIXTURES—Apparatus

A 2 liter 3 or 4 neck flask equipped with an agitator, nitrogen inlet, temperature probe (or thermometer) with thermowatch, equilibrium addition funnel, steam heated bubble type precondenser, distillation head with temperature probe (or thermometer), water cooled condenser, vacuum adapter, receiver, vacuum apparatus, heating mantles, lab jack, insulation.

Preparation of POLYMERS

The amidoamine MIXTURES 1, 2, 3 and 4 were individually mixed with TMPTA in a ratio of one part mixture and two parts TMPTA and reacted to form POLYMERS 1, 2, 3 and 4, respectively. The polymers were coated on the substrate surface and various physical properties of these coatings were measured and are summarized in the Tables below.

The amidoamines were made specifically as described below.

MIXTURE 1: Four hundred grams of tall oil rosin (Sylvaros®TORX available from Arizona Chemical, Panama City, Fla.) was charged to the flask. The rosin was melted while maintaining a nitrogen sweep. The agitator was started and 50 gms. of a tall oil fatty acid dimer, Sylvadym T-18 available from Arizona Chemical Company, Panama City, Fla., was added. The temperature was adjusted to 160° C. Approximately 550.0 gms. of triethylenetetramine (TETA) was added at 155–165° C. The reaction mixture was then heated to 250° C. at a rate such that the head temperature was maintained below 100° C. The reaction temperature was held at 250° C. for an acid number <4.0. With higher acid numbers, the resulting polymers with TMPTA have lower water resistance.

The mixture was cooled to 1800° C. and a vacuum applied for 15 minutes. The vacuum was broken and the mixture was cooled to 1000° C. and then filtered (preferably 75 micron). The sample was analyzed for acid number, amine value, viscosity and color. The results are summarized in TABLE III.

TABLE III

MIXTURE 1 PROPERTIES

| PROPERTY | SPECIFICATION | TYPICAL |
|---|---|---|
| ACID NUMBER | <4.0 | 3.3 |
| AMINE VALUE | 550–650 | 579 |
| VISCOSITY, 25° C. (BROOKFIELD) | 1,250–2,250 cps | 1,890 cps |
| COLOR, GARDNER | 12 max. | 11– |

In TABLE III, and in similar TABLES IV, V AND VI, the SPECIFICATION column refers to the manufacturing specifications (or limits) and the TYPICAL refers to the usual analysis. The measurements for Acid Number, Amine Value, Viscosity and Color were measured as described below.

The Acid Number is a measure of unreacted rosin (ASTM D-803-93).

The Amine Value is a measure of reactivity. The HCl method was used.

(mls HCl×normality HCl×56.1)/grams of sample

The test is conducted as follows: (a) Bromophenyl blue indicator—1.0 g. of bromophenyl blue in 500 mls methanol; (b) 0.1 Normal HCL; (c) Weigh 0.25 g sample to nearest 0.1 mg and dissolve in 100 mls isopropyl alcohol (d) Add 5 drops of indicator and titrate to yellow endpoint.

Viscosity measurements were made on a Brookfield, LVT, #21 spindle using a thermocel.

Color was determined with a Gardner Delta color wheel where 1 is colorless and 15 is dark (ASTM D 1544-80).

MIXTURE 2: Four hundred grams of dimer rosin, (Sylvaros®295 available from Arizona Chemical Company), Panama City, Fla., was charged to the flask. The rosin was melted while maintaining a nitrogen sweep. The agitator was started and 50 gms. of a tall oil fatty acid dimer, Sylvadym T-18 available from Arizona Chemical Company, Panama City, Fla., was added. The temperature was adjusted to 160° C. Approximately 550.0 gms. of triethylenetetramine (TETA) was added at 155–165° C. The reaction mixture was then heated to 250° C. at a rate such that the head temperature was maintained below 100° C. The reaction temperature was held at 250° C. for an acid number <4.0. The mixture was cooled to 180° C. and then a 25 inch vacuum was applied for 15 minutes. The vacuum was broken and the mixture was cooled to 100° C. and then filtered (75 micron). The sample was analyzed for acid number, amine value, viscosity and color as done with MIXTURE 1. The results are summarized in TABLE IV.

TABLE IV

MIXTURE 2 PROPERTIES

| PROPERTY | SPECIFICATION | TYPICAL |
|---|---|---|
| ACID NUMBER | <4.0 | 3.8 |
| AMINE VALUE | 550–650 | 619 |
| VISCOSITY, 25° C. (BROOKFIELD) | 3,000–5,000 cps | 3,750 cps |
| COLOR, GARDNER | 12 max. | 10 |

MIXTURE 3: Four hundred fifty grams of tall oil rosin, (Sylvaros®TORX available from Arizona Chemical Company, Panama City, Fla.), was charged to the flask. The rosin was melted while maintaining a nitrogen sweep. The temperature was adjusted to 160° C. Approximately 550.0 gms. of triethylenetetramine (TETA) was added at 155–165° C. The reaction mixture was then heated to 250° C. at a rate such that the head temperature was maintained below 100° C. The reaction temperature was held at 250° C. for an acid number <4.0. The mixture was cooled to 180° C. and a 25 inch vacuum was applied for 15 minutes. The vacuum was broken and the mixture was cooled to 1000° C. and then filtered (75 micron). The sample was analyzed for acid number, amine value, viscosity and color as done with MIXTURE 1. The results are summarized in TABLE V.

TABLE V

MIXTURE 3 PROPERTIES

| PROPERTY | SPECIFICATION | TYPICAL |
|---|---|---|
| ACID NUMBER | <4.0 | 3.2 |
| AMINE VALUE | 500–600 | 538 |
| VISCOSITY, 25° C. (BROOKFIELD) | 3,000–5,000 cps | 4,000 cps |
| COLOR, GARDNER | 12 max. | 11+ |

MIXTURE 4: Four hundred fifty grams of dimer rosin, (Sylvaros®295 available from Arizona Chemical Company, Panama City, Fla.) was charged to the flask. The rosin was melted while maintaining a nitrogen sweep. The temperature was adjusted to 160° C. Approximately 550.0 gms. of triethylenetetramine (TETA) was added at 155–165° C. The reaction mixture was then heated to 250° C. at a rate such that the head temperature was maintained below 100° C. The reaction temperature was held at 250° C. for an acid number <4.0. The mixture was cooled to 180° C. and then a 25 inch vacuum was applied for 15 minutes. The vacuum was broken and the mixture was cooled to 100° C. and then filtered (75 micron). The sample was analyzed for acid number, amine value, viscosity and color. The results are summarized in TABLE VI.

TABLE VI

MIXTURE 3 PROPERTIES

| PROPERTY | SPECIFICATION | TYPICAL |
|---|---|---|
| ACID NUMBER | <4.0 | 3.2 |
| AMINE VALUE | 550–650 | 580 |
| VISCOSITY, 25° C. (BROOKFIELD) | 3,000–5,000 cps | 4,300 cps |
| COLOR, GARDNER | 12 max. | 11+ |

TABLE VII

COATING EVALUATIONS

| ANALYSIS | POLYMER 1 | POLYMER 2 | POLYMER 3 |
|---|---|---|---|
| CROSS HATCH ADHESION | 4 | 5 | 4 |
| PENCIL HARDNESS | H | 5 H | H |
| IMPACT (in. - lbs) | pass 120 | pass 80 | pass 100 |
| FORWARD | pass 20 | pass 40 | pass 20 |
| REVERSE | | | |
| WATER RESISTANCE (total immersion) | some degrading after 4 months | no degrading after 12 months | some degrading after 10 weeks |
| UV RESISTANCE (sunlight) | some degrading after 3 weeks | no degrading after 7 weeks | some degrading after 3 weeks |

The results in TABLE VII are from polymers which were evaluated as cured draw downs on cold rolled steel panels (ACT Labs, Inc. 517-439-1485 - 04x12x032; B37 P60 DIW; polish). The draw down bar is a metal bar used to prepare films of a certain thickness as determined by the clearance at the bottom of the bar. The polymers can also be coated on substrates such as asphalt, wood, and glass as well as other surfaces. The polymers provide good water and UV resistance and have good adhesion to metal surfaces. The measurements for Cross Hatch Adhesion, Pencil Hardness, Impact and UV Resistance were measured as described below.

Cross Hatch Adhesion measures how well the coating adheres to the substrate. It is a well known measurement—ASTM D-3359. A razor with multiple blades cuts a grid in the coating. Special tape is applied to the grid. When the tape is removed, squares of coating within the grid may be removed if adhesion is inadequate.

Pencil Hardness is a measurement using a device with pencil loads of varying hardness required to scratch the coating—ASTM D-3363.

Impact—Forward/Reverse A weighted plunger is dropped on the coating to test its flexibility. This is a well known test—ASTM D-2794. The coating fractures if it is too brittle. Forward impact measures outside coating flexibility and reverse impact measures internal flexibility of the coating. The higher the number the more flexible.

Water resistance measures the tendency of a coating to degrade and lose its adhesion to the substrate. A cured film of the polymer on a cold rolled steel panel is immersed in a container of water. The panel is removed from the container periodically to inspect for any degradation or change in the film.

UV resistance measures the tendency of a coating to yellow or chalk in sunlight. A cured film of the polymer on a cold rolled steel panel is subjected to radiation from a UV lamp or sunlight. The panel is periodically inspected for yellowing and/or degradation of the film.

The polymer coatings were also tested with various chemicals using the 7 day chemical spot test. A cured film of the polymer on a cold rolled steel panel is evaluated for resistance to various chemicals for a period of 7 days by placing a drop of each chemical on the film and surrounding each drop with the mouth of a small inverted vial to which an inert sealant has been applied. As indicated below ETCHED—means the surface was marked; DESTROYED—means total loss of the film and OK—means no effect. The results of the chemical resistant characteristics of the coatings are summarized in TABLE VIII below.

TABLE VIII

| CHEMICAL RESISTANCE | | | |
|---|---|---|---|
| CHEMICAL | POLYMER 1 | POLYMER 2 | POLYMER 3 |
| xylene/isopropyl alcohol (1/1) | etched | ok | etched |
| ethyl acetate | ok | ok | ok |
| acetone | ok | ok | ok |
| acetic acid (5%) | destroyed | destroyed | destroyed |
| NaOH (10%) | ok | ok | etched |
| HCL (10%) | etched | destroyed | destroyed |
| xylene | ok | ok | ok |
| methanol | ok | ok | ok |
| CC14 | ok | ok | ok |
| 3A* alcohol | etched | ok | etched |

TABLE VIII-continued

| CHEMICAL RESISTANCE | | | |
|---|---|---|---|
| CHEMICAL | POLYMER 1 | POLYMER 2 | POLYMER 3 |
| ethanol (200P) | etched | ok | etched |
| mineral oil | ok | ok | ok |
| gasoline | ok | ok | ok |

*3A alcohol - Denatured alcohol (ethyl alcohol-88.1% water-7.2% methyl alcohol-4.7%)

The cure rate for POLYMER 1 coatings were measured and summarized in TABLE IX below. The higher the temperature the faster the cure rate.

TABLE IX

| POLYMER COATING 1 - CURE RATES | |
|---|---|
| TEMPERATURE | CURE RATE, min |
| 25° C. | 30 |
| 50° C. | 15 |
| 62° C. | 10 |
| 75° C. | 6 |
| 100° C. | 2 |

3 mil film, rubbery—no tack. The film is flexible, but not tacky to the touch.

EXAMPLE II

ROADMARKING FORMULATION

A roadmarking formulation was produced comprised of:

| | |
|---|---|
| MIXTURE 1/TMPTA (½) | 50 parts |
| TiO2 | 10 parts |
| CaCO3 | 40 parts |
| Glass Beads | 30 parts |

The $TiO_2$, $CaCO_3$ and glass beads were mixed with the TMPTA. This mixture was then stirred with MIXTURE 1 and applied 20 mils thick with a draw down bar to a cold rolled steel panel which had been preheated to 75° C. or 1000° C. The panel was held at temperature on a stoke gel plate.

The cure times were:

75° C. 6 minutes—rubbery, no tack

100° C. 2 minutes—rubbery, no tack

Numerous modifications are possible in light of the above disclosure such as utilizing the polymer as an adhesive to adhere two surfaces together. The coated substrate can be provided with release properties or the polymers of the inventions can be used themselves as integral films.

Therefore, although the invention has been described with reference to certain preferred embodiments, it will be appreciated that other composite structures and processes for their fabrication may be devised, which are nevertheless within the scope and spirit of the invention as defined in the claims appended hereto.

What is claimed is:

1. A polymer having the following structural formula:

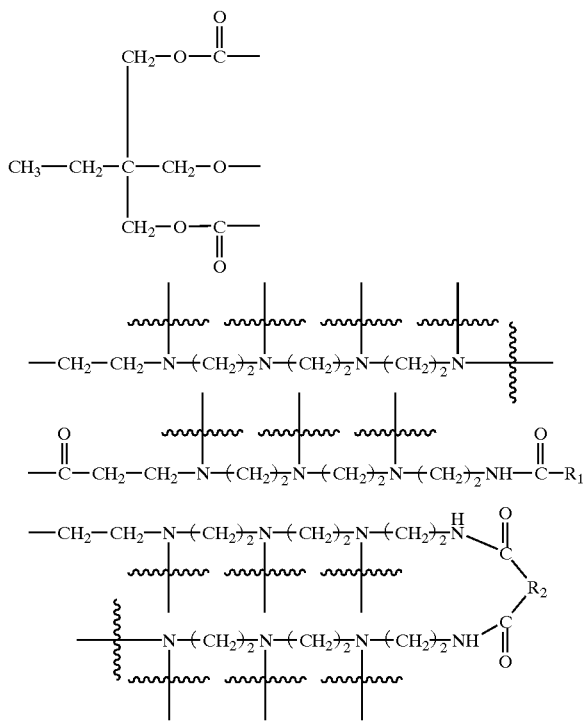

where $R_1$ = rosin;
$R_2$ = dimer rosin or fatty acid dimer or $R_1$.

2. A polymer produced from the reaction of component A and component B under controlled conditions; wherein said component A is a rosin amidoamine/polyethylene amine mixture; and said component B is a multifunctional acrylate ester.

3. The polymer according to claim 2, wherein one part said component A is reacted with two parts of said component B.

4. The polymer according to claim 2, wherein component A mixture is further comprised of a dimer fatty acid and/or a rosin dimer.

5. The polymer according to claim 2, wherein said component B is trimethylolpropane triacrylate (TMPTA).

6. The polymer according to claim 5, wherein one part of said component A is reacted with two parts of said component B.

7. The polymer according to claim 4, wherein component A is further comprised of a dimer fatty acid and component B is trimethylolpropane triacrylate (TMPTA).

8. The polymer according to claim 4, wherein component A is further comprised of a dimer rosin and component B is trimethylolpropane triacrylate.

9. The polymer according to claim 4, wherein component A is further comprised of dimer rosin and a dimer fatty acid and component B is trimethylolpropane triacrylate (TMPTA).

10. The polymer according to claim 1 having water and UV resistance.

* * * * *

UNITED STATES PATENT AND TRADEMARK OFFICE
CERTIFICATE OF CORRECTION

PATENT NO.   : 6,455,633 B1
DATED        : September 24, 2002
INVENTOR(S)  : Jones et al.

It is certified that error appears in the above-identified patent and that said Letters Patent is hereby corrected as shown below:

Title page,
Item [73], Assignee: delete "International Paper Company, Stamford, CT" and insert -- Arizona Chemical Company, Jacksonville, FL --.

Column 3,
Line 55, delete "valustris," and insert -- palustris --.

Column 4,
Line 66, delete "160%" and insert -- 16% --.

Column 6,
Line 62, delete "1800°C" and insert -- 180°C --.
Line 64, delete "1000°C" and insert -- 100°C --.

Column 8,
Line 7, delete "1000°C" and insert -- 100°C --.

Column 10,
Line 49, delete "1000°C" and insert -- 100°C --.

Signed and Sealed this

Twenty-eighth Day of January, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,455,633 B1
DATED : September 24, 2002
INVENTOR(S) : Jones

It is certified that error appears in the above-identified patent and that said Letters Patent is hereby corrected as shown below:

Column 8,
Line 40, delete "MIXTURE 3 PROPERTIES," and insert -- MIXTURE 4 PROPERTIES --.

Signed and Sealed this

Eighteenth Day of February, 2003

JAMES E. ROGAN
*Director of the United States Patent and Trademark Office*